April 12, 1932.   C. H. OAKLEY   1,853,990
COMPOSITE RUBBER STRUCTURE
Filed Sept. 1, 1926
Fig.1.
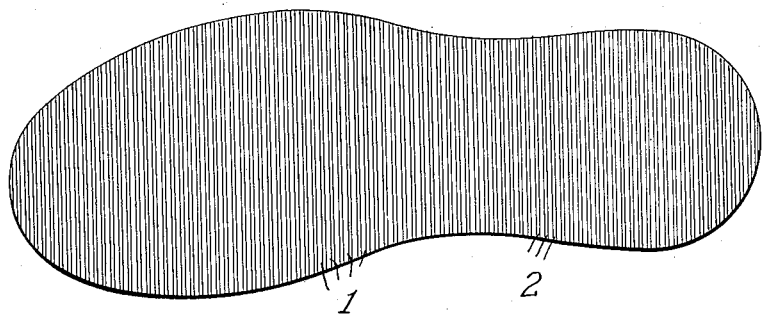
Fig.2.                Fig.3.
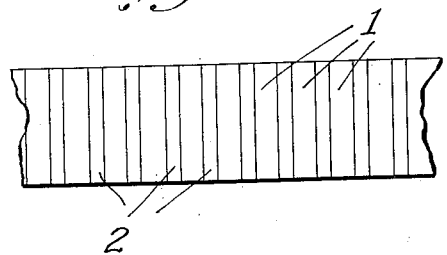   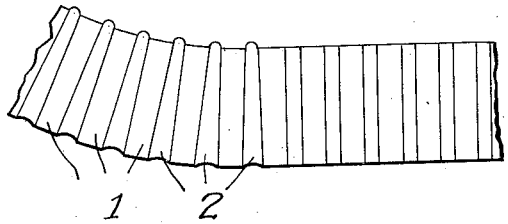
Inventor
Clifford H. Oakley
By his Attorneys
Emery, Booth, Janney & Varney Patented Apr. 12, 1932

1,853,990

UNITED STATES PATENT OFFICE

CLIFFORD H. OAKLEY, OF TRENTON, NEW JERSEY, ASSIGNOR TO ESSEX RUBBER COMPANY, INC., OF TRENTON, NEW JERSEY, A CORPORATION OF NEW JERSEY

COMPOSITE RUBBER STRUCTURE

Application filed September 1, 1926. Serial No. 133,025.

The present invention relates generally to the manufacture of rubber goods, and more specifically to a vulcanized rubber product particularly adapted for use as a tread surface for boots and shoes and to the method of making such products.

It is an object of the invention to provide a fabricated rubber product which, by reason of its structure and method of manufacture, will combine to a high degree certain desirable characteristics which it has not been possible to combine in a homogeneous product, for the reason that a change in the compounding such as to improve the quality of the composition in one respect resulted in impairing the quality of the composition in another respect. For example, a homogeneous compound for shoe soles can be made highly flexible by sacrifice of the quality of firmness; it can be made highly resistant to abrasive wear by sacrifice of the quality of flexibility; but all of these desirable qualities have not been successfully combined to their full extent in a homogeneous composition.

As an illustrative example of one embodiment of the present invention, a built up structure may be provided formed of a multiplicity of alternate distinct masses of rubber of different composition and characteristics and arranged to permit the different masses each to perform independently the functions for which they are particularly designed, such structure being preferably vulcanized to cause the separate masses to adhere one to another. Thus, as a specific example, it is proposed to provide a structure composed entirely of rubber, comprising alternate masses of firm wear resistant composition and flexible yieldable elastic composition, so arranged that the elastic masses give and stretch when the structure is flexed, while the firmer wear resistant masses retain substantially their original shape, and thus are not subjected to destructive internal stresses and strains, these being taken up in the elastic masses.

For purposes of illustration, the invention is shown as embodied in a shoe tread material and in the drawings:—

Figure 1 is a top plan view of a rubber sole embodying the invention.

Figure 2 is an enlarged fragmentary side elevation showing the strata, and

Figure 3 is a similar view showing the effect of flexing.

Referring to the drawings, the invention has been illustrated as applied to a sole consisting of a series of layers or strata of rubber having the characteristics described above, the strata 1 being of rubber of high wear resistant quality while the strata 2 are of rubber of flexible, elastic composition. The strata are preferably so disposed as to present edges to the surface of the sole preferably lying on edge in parallel planes in such manner that the upper and lower surfaces of the sole present a striped or stratified appearance.

Referring to Figures 2 and 3, it will be observed that if a sole of the character described is laid on a flat surface contact will be established between each of the strata and the flat surface, assuming, of course, that the sole has not been subjected to wear such as to cause one set of strata to wear more rapidly than the other set of strata. Referring to Figure 3, however, if the sole is flexed, the elastic strata are distorted in the manner illustrated, the effect being that the cross-sectional form of the elastic strata is changed, while the cross-sectional form of the firmer strata remains substantially the same. The convex face of the sole thereby presents a serrated or corrugated surface, the exposed edges of the firm wear resistant strata projecting beyond the elastic strata which latter tend to sag between the firmer strata. The concave face of the sole also presents a corrugated surface, for the elastic strata are compressed between the ends of the firmer strata and bulge outwardly therebetween.

Actual trial of the sole on shoes discloses the fact that the yieldable material between the strata of firm material scuffs off due to abrasive wear just enough so that at all wearing points on the bottom of the sole the firm strata stand out somewhat in relief even when the sole is not flexed, and thus through normal wear the yieldable material will maintain its wearing surface at a rather slight, but nevertheless definite distance above the wearing surface of the firm strata, thereby automatically perpetuating a slight but adequate serrated surface of uniform character throughout the life of the sole.

As a specific example of rubber compositions which have been found satisfactory, the flexible strata may be made of a composition consisting of between 80 and 90% crude rubber to which may be added a filler such as magnesia, for example, and any suitable vulcanizing agent. The wear resistant strata may be made of a composition consisting of less than 20% crude rubber, approximately 60% reclaimed rubber, approximately 10% carbon black, or other suitable filler and a suitable vulcanizing agent.

The relative thickness of the two kinds of strata may be varied as desired, although it has been found that the flexible strata may be made considerably thinner than the firm wear resistant strata with good results. For example, it has been found satisfactory to provide flexible strata of approximately one-half the thickness of the firm wear resistant strata.

Thus, a structure is provided, consisting entirely of rubber, but composed of distinct masses of rubber of different composition and characteristics, the masses of one composition being particularly compounded to resist abrasive wear and to sustain with firmness the weight of the wearer, while the masses of the other composition are particularly designed to impart flexibility and elasticity. The wear resistant composition, accordingly, is permitted to perform the function for which it is particularly designed, without the necessity of withstanding repeated flexing, while the flexible elastic composition is permitted to perform the functions for which it is particularly designed without the necessity of withstanding abrasive wear.

In addition, due to the yieldable character of the elastic strata the weight of the wearer is permitted to be impressed and concentrated upon the firmer strata whereby a firmer contact between the exposed surfaces of such strata and the pavement results, thus permitting a firmer foothold than is otherwise possible. In wet weather also surface moisture on the pavement is expelled from all areas with which the firm material contacts, and is driven to the areas occurring underneath the yieldable strata, these being areas of less pressure, thereby increasing the coefficient of friction between said firm material and the pavement, thereby tending to reduce slippage.

In making the described structure, masses of rubber of the desired composition may be calendered into sheets of proper thickness, which sheets may be cut into strips of proper dimensions. The said strips may then be laid on edge alternately in the manner shown in the drawings, and the assembled strips may then be vulcanized in the usual manner.

It will be understood that the invention may be variously modified and embodied within the scope of the sub-joined claims.

I claim as my invention:

1. A rubber sole comprising a multiplicity of adjacent alternate strata of different degrees of elasticity, said strata being arranged to lie on edge and extending throughout the thickness of the sole, the strata of greater elasticity being of less thickness than the strata of less elasticity.

2. A rubber sole comprising a multiplicity of adjacent alternate vertical strata of different degrees of elasticity, said strata extending throughout the thickness of the sole, one set of said strata comprising not less than 80% crude rubber and the other set of said strata comprising not more than 20% crude rubber.

3. A rubber sole comprising a multiplicity of adjacent alternate vertical strata of different degrees of elasticity, one set of said strata comprising not less than 80% crude rubber and the other set of said strata comprising not more than 20% crude rubber, the strata having the greater crude rubber content being of less thickness than the strata of less crude rubber content.

In testimony whereof, I have signed my name to this specification this thirtieth day of August, 1926.

CLIFFORD H. OAKLEY.